(12) United States Patent
Reel et al.

(10) Patent No.: US 6,873,936 B2
(45) Date of Patent: Mar. 29, 2005

(54) METHOD AND SYSTEM FOR PROCURING, STORING AND DISTRIBUTING REMOTELY ACCESSED DATA GATHERED BY LOGGING DEVICES

(75) Inventors: Greg T. Reel, San Jose, CA (US); Jon Y. Nakagawa, Piedmont, CA (US); Kevin E. Flynn, Oakland, CA (US)

(73) Assignee: Marathon Products, Inc., Oakland, CA (US)

(*) Notice: Subject to any disclaimer, the term of this patent is extended or adjusted under 35 U.S.C. 154(b) by 0 days.

(21) Appl. No.: 10/781,273

(22) Filed: Feb. 17, 2004

(65) Prior Publication Data

US 2004/0167837 A1 Aug. 26, 2004

Related U.S. Application Data

(62) Division of application No. 10/724,660, filed on Dec. 1, 2003, which is a continuation of application No. 09/487,766, filed on Jan. 19, 2000, now abandoned.
(60) Provisional application No. 60/152,397, filed on Sep. 3, 1999.

(51) Int. Cl.[7] .............................................. G06F 17/60
(52) U.S. Cl. ........................................ 702/187; 705/29
(58) Field of Search .......................... 702/187; 705/18, 705/26, 29, 30, 32, 40, 52, 53, 44

(56) References Cited

U.S. PATENT DOCUMENTS

| | | |
|---|---|---|
| 4,783,748 A | 11/1988 | Swarztrauber et al. |
| 4,893,248 A | 1/1990 | Pitts et al. |
| 5,247,575 A | 9/1993 | Sprague et al. |
| 5,475,742 A | 12/1995 | Gilbert |
| 5,608,874 A | 3/1997 | Ogawa et al. |
| 5,634,012 A | 5/1997 | Stefik et al. |
| 5,694,549 A | 12/1997 | Carlin et al. |
| 5,701,152 A | 12/1997 | Chen |
| 5,717,923 A | 2/1998 | Dedrick |
| 5,737,414 A * | 4/1998 | Walker et al. ................. 705/40 |
| 5,764,739 A | 6/1998 | Patton et al. |

(Continued)

*Primary Examiner*—Carol S Tsai
(74) *Attorney, Agent, or Firm*—Reed Smith LLP

(57) ABSTRACT

A method for billing customers over the Internet or other means of electronic communication between an access provider and a customer for use of services. The provider creates access to measurement data obtained by the customer for electronic data loggers which have been programmed for one time use by the manufacturers, distributor or agent for use by the customer or customers. A unique identity is embedded within the measurement device so that the provider can associate measurement data and/or billing information with the customer or end user. The provider then bills the transaction to either the user's account or those of designated account holders. This method for billing customers is applicable for all sensor based technologies to include temperatures, humidity, pressures, light, events, voltage, acceleration, shock, strain, flows and any other discipline where electronic sensors are embedded in devices programmed for one-time use and used in either remote locations or during transportation. The system and method may also include device locating means. While having the unit returned enables the manufacturer or agency the opportunity to resell the unit for further commercial benefit, the device may be remotely reprogrammed for further use, because the present invention with its web-enabled technology allows the user to reprogram the device through a central server so that it does not have to be returned and allows the provider the ability to track, monitor, store and bill the customer each time the device is enabled, programmed or read.

12 Claims, 6 Drawing Sheets

U.S. PATENT DOCUMENTS

| | | |
|---|---|---|
| 5,809,144 A | 9/1998 | Sirbu et al. |
| 5,860,068 A | 1/1999 | Cook |
| 5,875,436 A | 2/1999 | Kikinis |
| 5,893,077 A | 4/1999 | Griffin |
| 5,911,582 A | 6/1999 | Redford et al. |
| 5,943,656 A | 8/1999 | Crooks et al. |
| 5,949,875 A | 9/1999 | Walker et al. |
| 5,956,697 A * | 9/1999 | Usui .......................... 705/32 |
| 5,958,016 A | 9/1999 | Chang et al. |
| 5,960,416 A | 9/1999 | Block |
| 6,173,407 B1 * | 1/2001 | Yoon et al. ................. 713/201 |
| 6,204,763 B1 | 3/2001 | Sone |
| 6,308,171 B1 * | 10/2001 | De La Huerga ............... 707/3 |
| 6,341,271 B1 | 1/2002 | Salvo et al. |
| 6,446,048 B1 * | 9/2002 | Wells et al. .................. 705/35 |
| 6,718,015 B1 * | 4/2004 | Berstis .................... 379/88.17 |
| 2001/0049637 A1 * | 12/2001 | Tso ............................ 705/26 |
| 2001/0049641 A1 * | 12/2001 | Nakamura et al. ............ 705/26 |

* cited by examiner

METHOD AND SYSTEM FOR PROCURING, STORING AND DISTRIBUTING REMOTELY ACCESSED DATA GATHERED BY LOGGING DEVICES

CROSS REFERENCE TO RELATED APPLICATIONS

This is a divisional application of U.S. patent application Ser. No. 10/724,660, filed Dec. 1, 2003, which is a continuation of U.S. patent application Ser. No. 09/487,766, filed Jan. 19, 2000 now abandoned, which was based upon and takes priority from Provisional Patent Application Ser. No. 60/152,397, filed Sep. 3, 1999.

BACKGROUND OF THE INVENTION

1. Field of the Invention

The present invention relates generally to the field of monitoring temperature, humidity and/or other environmental or product characteristics for stationary storage and shipping quality control applications and, in particular, to a system for remotely accessing such information across a computer network and billing for such service.

2. Background

Most of the presently available technology for tracking time and temperature during the shipment of perishable and environmentally-sensitive commodities has technological roots over 70 years deep. Devices tracking time and temperature have been widely used in the transportation industry for monitoring shipments of fruits and vegetables, chemicals, poultry, seedpods, flowers, frozen foods, drugs, biologics and other temperature-sensitive goods. Manufacturers of time and temperature investigative devices have sold these recording instruments to manufacturers, growers, and shippers of goods requiring environmental control during transportation and storage.

Generally, there are three commonly used existing technologies for such use: strip chart recorders, circular graphs and electronic data loggers. The terms "data logger, "monitoring device" and "data recorder", as used herein are intended to cover any electronic, electro-mechanical, or electro-chemical apparatus, whether digital or analog, utilizing sensor-based technologies for measuring and tracking the relevant data over time, including both storing such data for later reading and enabling real-time access to the data. Use of these devices is especially commonplace in shipment and storage situations requiring strict documentation for quality assurance, since molecular structures can be changed by improper temperature maintenance, and such change can ruin perishable items. Like temperature, other factors such as humidity, vibration, and levels of oxygen, nitrogen and other gases can also have a profound effect on cell biology and molecular structure during storage and transportation.

Recently, programmable electronic data loggers and real-time electronic monitoring devices have become available at considerable costs to end users for direct measurements of temperature, humidity, ambient pressure, water flow levels, gas levels, vibration, acceleration, strain, voltage and photonic exposure levels as well as other environmental criteria, in both storage and transportation. However, despite the wide availability of these devices, the industry is not without room for considerable improvement. Available programmable electronic data loggers and real time electronic monitoring devices are expensive, coming with high maintenance costs associated with returning, servicing, programming, calibrating and where necessary, reading and replacing thermographic paper for strip charts, and provide only delayed processing and limited access to processed information. Often times, because of the high cost associated with return shipment of a device for reading or reuse, the device is sent overseas with a shipment and never returned to a party who desires to review the tracking data or reuse the device. Also, current manufacturers of single use devices such as strip charts do not encourage the return of the devices because transportation and return costs would negate any economic benefit from reuse. Further, the recorded data, whether recorded on thermographic paper or more sophisticated electronic devices, is not easily communicated to all interested parties when used in a system wherein return of the information to the shipper is voluntary and not automated. This poses a problem for the shipper or storer of perishable or environmentally sensitive goods. Without data returned from the shipment destination, shippers have no record of transportation conditions and have no way of determining the causes of problems should products arrive in unsatisfactory condition. Another problem associated with current data logger operation is that maintaining a large inventory of electronic data records is both costly and care intensive, and maintaining a large inventory of loggers for customers is expensive.

The present invention addresses the shortcomings of the available art in a highly efficient manner while simultaneously enabling the device manufacturer or other entity controlling the logger to charge for services each time information is communicated to interested parties.

SUMMARY OF THE INVENTION

Today all electronic data loggers are read visually (i.e., paper strip charts) or with computers and software residing at or near the physical location where the device is read. This information is then stored on a disk drive or other long term stable storage means if in electronic form, or, if in paper form, in a physical file which can be copied when needed. Information can then be telefaxed or otherwise distributed to interested parties, in a manner controlled by the party in possession of the data logger. This shipping data acquisition process is time consuming and subject to fraudulent manipulation, since if a problem occurs that the person reading the information (e.g., the entity responsible for safely shipping the product) may not wish to disclose, the information may be suppressed or the data logger lost or destroyed after the information is reviewed.

Therefore, the presently preferred embodiment of the present invention provides a method and system wherein the data logger is connected through a wide area network (preferably the word wide web graphical layer of the Internet) to a data acquisition server. The connection may be direct, through a phone line, via radio signals, or any other compatible communications method as will be understood by those skilled in the art to which the present invention pertains. A combination of remote (e.g., at the logger manufacturer's computer server or a server under control of an entity handling administration of the inventive system and method) and locally hosted (residing in the local computer onsite to the data logger) software, identifies and reads the device through the network and a local connection to the data logger. Only once this connection is established can the information be accessed and permanently stored with an electronic footprint indicating the source. No longer can the end user or other party receiving the device access the information and then claim they either never received the device or received it but couldn't read it. Information obtained through the method and system of the present invention can then simultaneously or at specified times be forwarded (via any communication method, such as postal carrier, courier, telefax, e-mail, or other electronic method) to the shipper and/or receiver, as well as any interested and authorized third party, even at multiple locations. The data logger can also be reprogrammed over the network connection, and thereby recycled for further use without the problems associated with returning the device to the manufacturer for reprogramming. The device can then be sent directly to the shipper for future use, or used by the recipient for shipment of another item to a third party.

It should be noted here, that the presently preferred data logger will store data over a particular period of time (for example, during product shipment) and then relate the stored data to the manufacturer or the logger's controlling entity. However, the data logger may also be accessed in "real time" while data is being collected (for example, during long term storage, such as in a meat cooler at a fast food restaurant) to remotely check and report monitored conditions.

BRIEF DESCRIPTIONS OF THE DRAWINGS

A detailed description of the present invention will be more easily understood with reference to the accompanying drawings, which are to be considered an integral part of the disclosure of the present invention, wherein.

Figure 3:
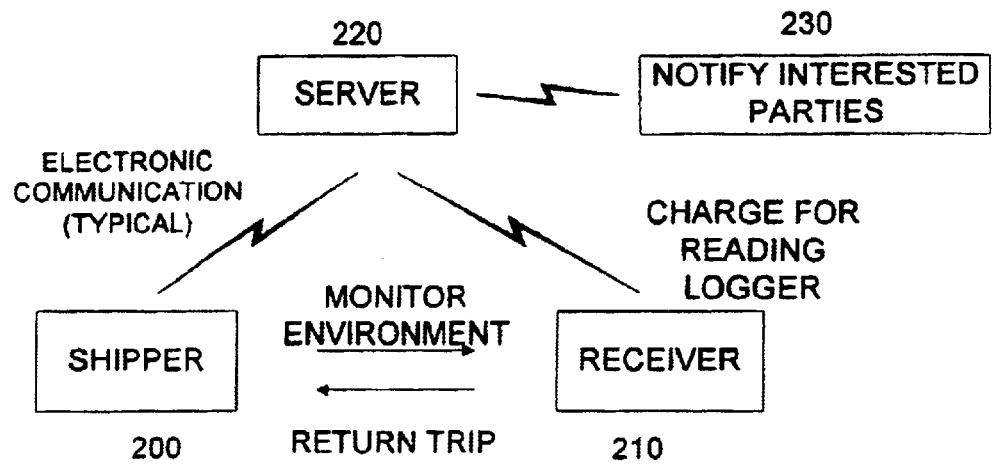
Figure 4:
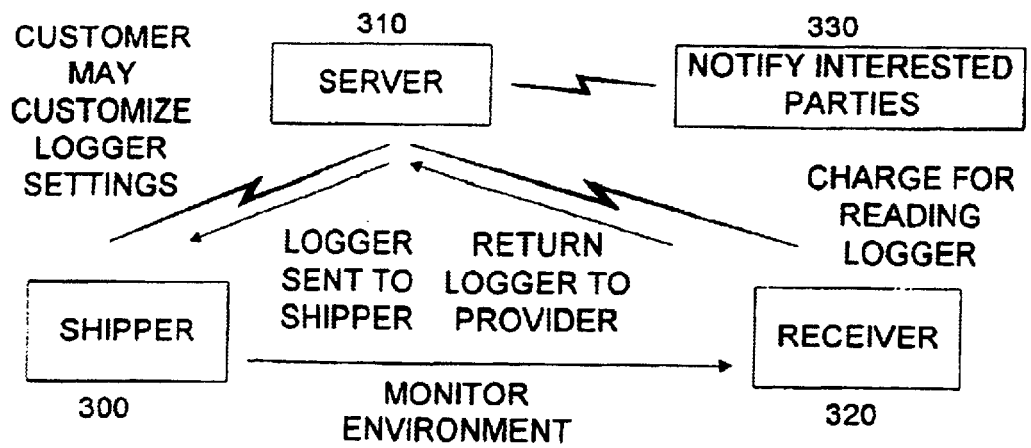
Figure 5:
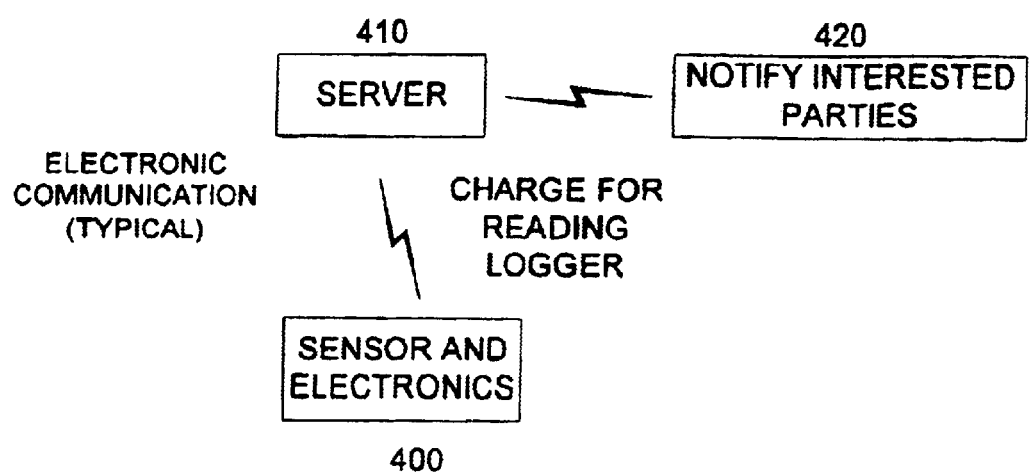

FIG. 3 provides a first block diagram illustrating a presently preferred embodiment of the system of the present invention;

FIG. 4 provides a second block diagram illustrating an alternative embodiment of the system of the present invention; and FIG. 5 provides a third block diagram illustrating another alternative embodiment of the system of the present invention.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION OF PREFERRED AND ALTERNATIVE EMBODIMENTS

A system and method for providing a closed or open system of digital data management between suppliers, shippers and end users (suppliers' customers) via computer hardware and software are provided. The presently preferred system allows a party or plurality of parties to receive tracked data and to communicate the data, either in raw form or other desired format, to an unlimited but controlled number of participants (e.g., shippers, suppliers, quality control managers, inventory managers, manufacturing personnel, and purchasing departments), immediately upon recording device interrogation, upon the occurrence of a predetermined event(s) or at specified time intervals. The presently preferred embodiment of the invention preferably reads the logger device through a web-enabled server so that a service fee may be charged. The presently preferred embodiment of the inventive method and system is preferably not limited to temperature investigative devices, but also applies to any and all sensor-based technologies, whether electrical, electromechanical or electro-chemical, such as humidity, pressure, water flows, gases, vibration, acceleration, strain, voltage, or photonics, during storage or transport.

In another embodiment, the present invention provides a method and system whereby logger reprogramming costs can be dramatically reduced or eliminated and the attendant packaging costs of both shipping and handling transferred to the data logger end user. This embodiment of the inventive system thereby enables the logger manufacturer to reduce its inventory carrying costs and increase its return on invested capital by substantially reducing or eliminating labor costs associated with repackaging the logger devices. Moreover, stocking inventory costs may be transferred to the customer if desired. If the customer wishes the manufacturer to reprogram and repackage the device, this can still be accommodated at higher costs to the customer.

The format of the data provided from the server to customers can be the raw data, a graphical representation of the data, alarm codes or any other type of format that is desired by the customer and/or the receiving party. Further, prior to transmission of the data certain operations can be determined and included as part of or in lieu of the any other data transmitted. For instance, mean, median or other data may be included along with temperature data. Also, the status or priority of the entity accessing the device may play a role in determining what form the data will take.

Figure 1:
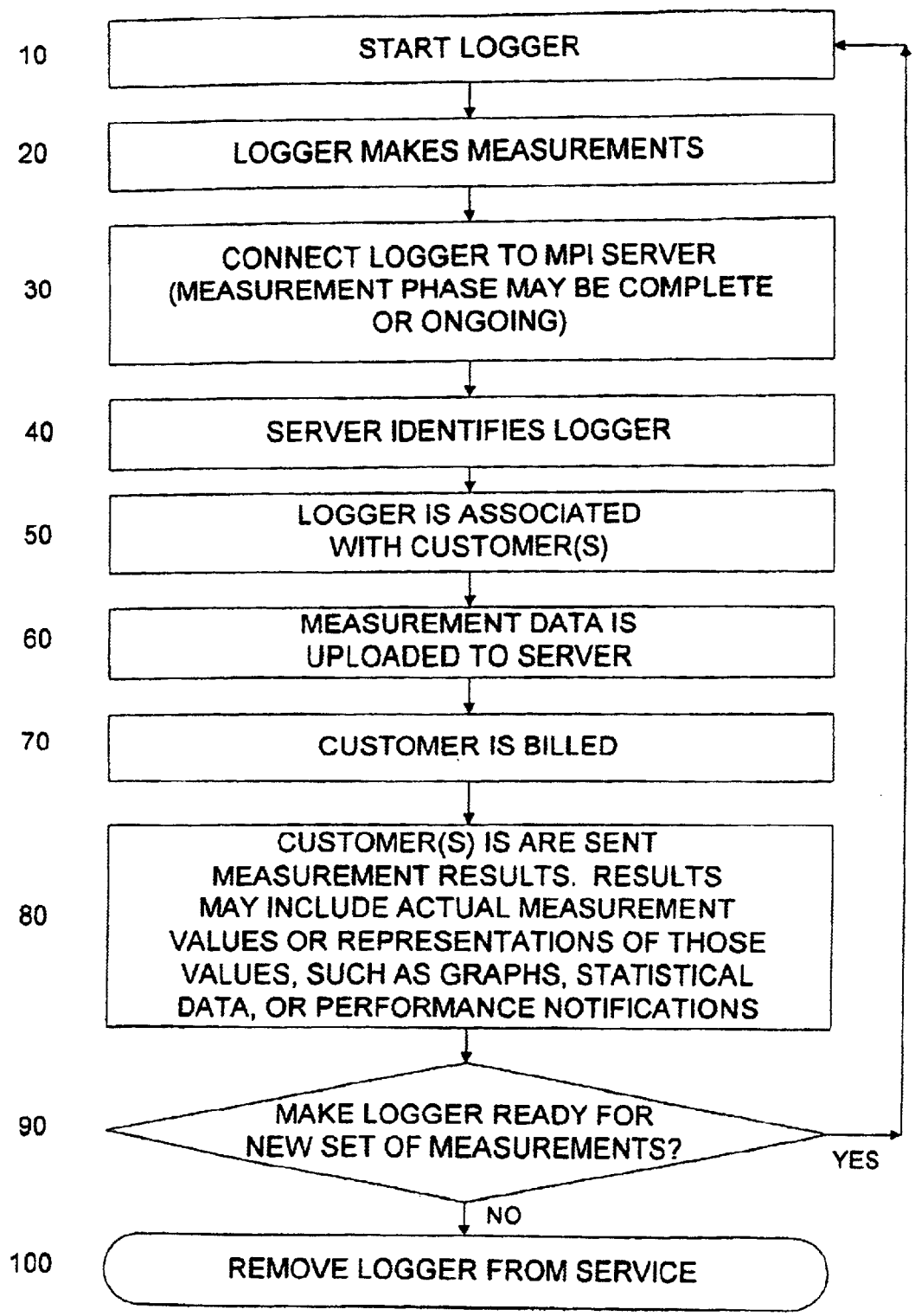
FIG. 1 is a flow chart illustrating a method of remotely reading, enabling and reprogramming data loggers, and charging according to a presently preferred embodiment of the present invention.

Referring to FIG. 1, the logger makes measurements utilizing one or more sensors such as a thermometer and a humidity sensor, step 20. The logger can then take the appropriate sensor readings. In the case of continuous operation, wherein the sensed data is being continuously read, it may be that the data will only be buffered in memory at step 20. In the case of time-based, remote, or other programmed activation, the logger will take the measurement or reading subsequent to this activation. After the measurements are completed, such as at the end of a shipment of fragile goods, during measurement (such as in transit), or at a predetermined time the logger communicates over a communication link (e.g., a modem-based Internet link, direct network link, wireless link or any other connection to a computer network) to the controlling entity's system, e.g. a server, step 30. The server identifies the logger based upon an electronic footprint, Electronic Serial Number or other identifier, embedded in the data logger, step 40. The measurement data is then associated with the appropriate customer, step 50. The measurement data is uploaded to the server, where it is stored or otherwise manipulated as desired, step 60. It should be noted that although the presently preferred embodiment performs customer billing at the time of each upload, that billing can occur after the upload or can be performed at predetermined time periods. The server then generates customer billing information for the specific transaction, step 70. Additionally, it should be noted that although the presently preferred embodiment depicts billing after each transmission of sensor-based data, the present invention can bill in any number of ways, including, but not limited to: per shipment, length of time used, number of calculations on any data set, or further ways. The system then sends the measurement data or other representations of that data, as desired by the customer, to the customer or other designated party for receiving such information, step 80. At that point, the system determines whether the logger will need to perform additional measurements or operations, step 90. If it is determined that additional operations, which may be of the same or a different type depending on the types of sensors coupled with, in electrical communication with, or integral to the logger, then the logger may be reset to make a new set of measurements and the above described process is repeated. If it is determined that no further measurements or operations are required, then the logger can be removed from service by either shutting it off or by ceasing further communication with the logger, step 100.

Figure 1A:
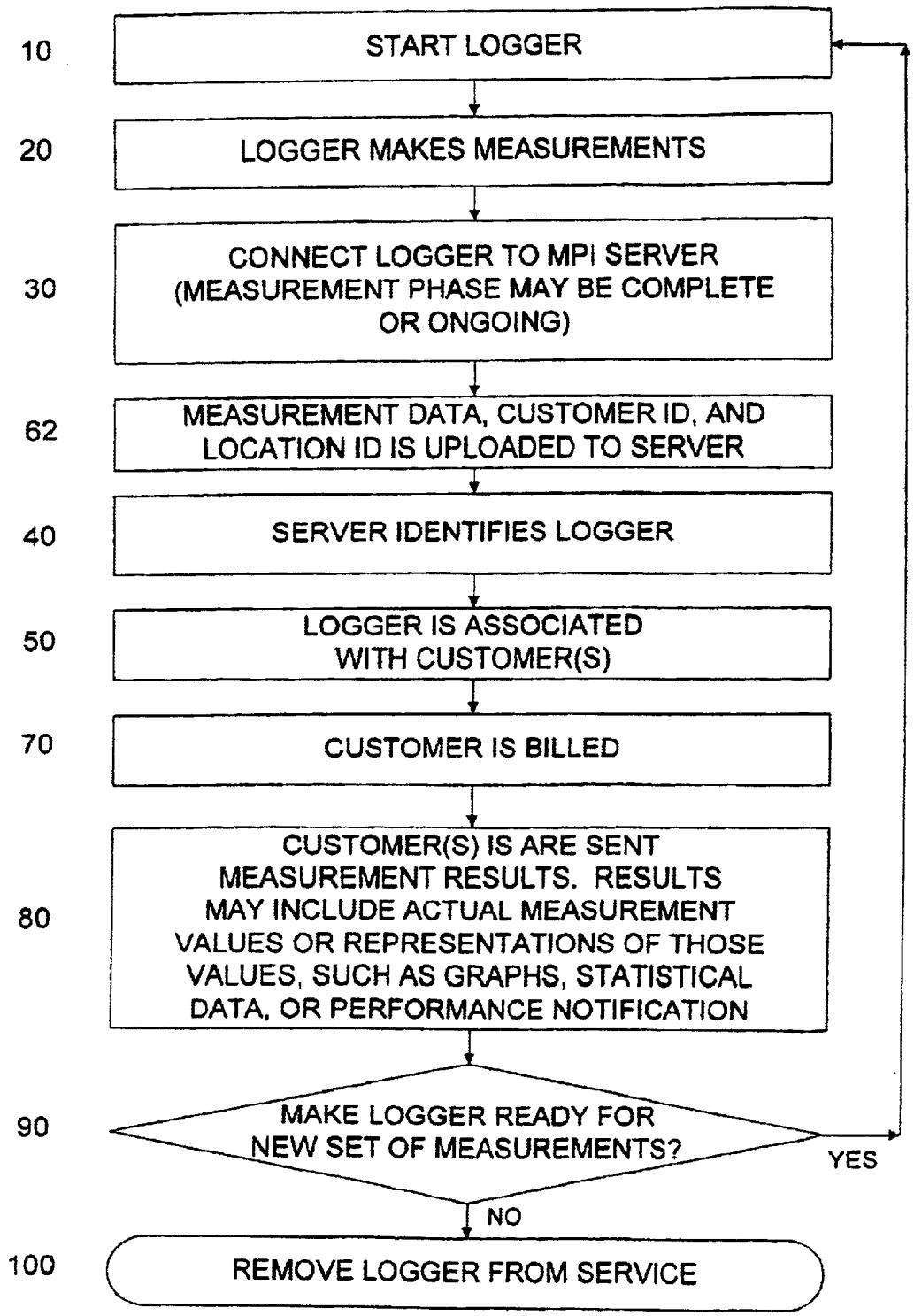
FIG. 1A is a flow chart illustrating an alternative to the embodiment illustrated in FIG. 1.

The method illustrated in the flow chart of FIG. 1A provides an alternative to that illustrated in FIG. 1. Step 60 has been moved in sequence and modified to include customer identifying and location identifying information at step 62.

Figure 2:
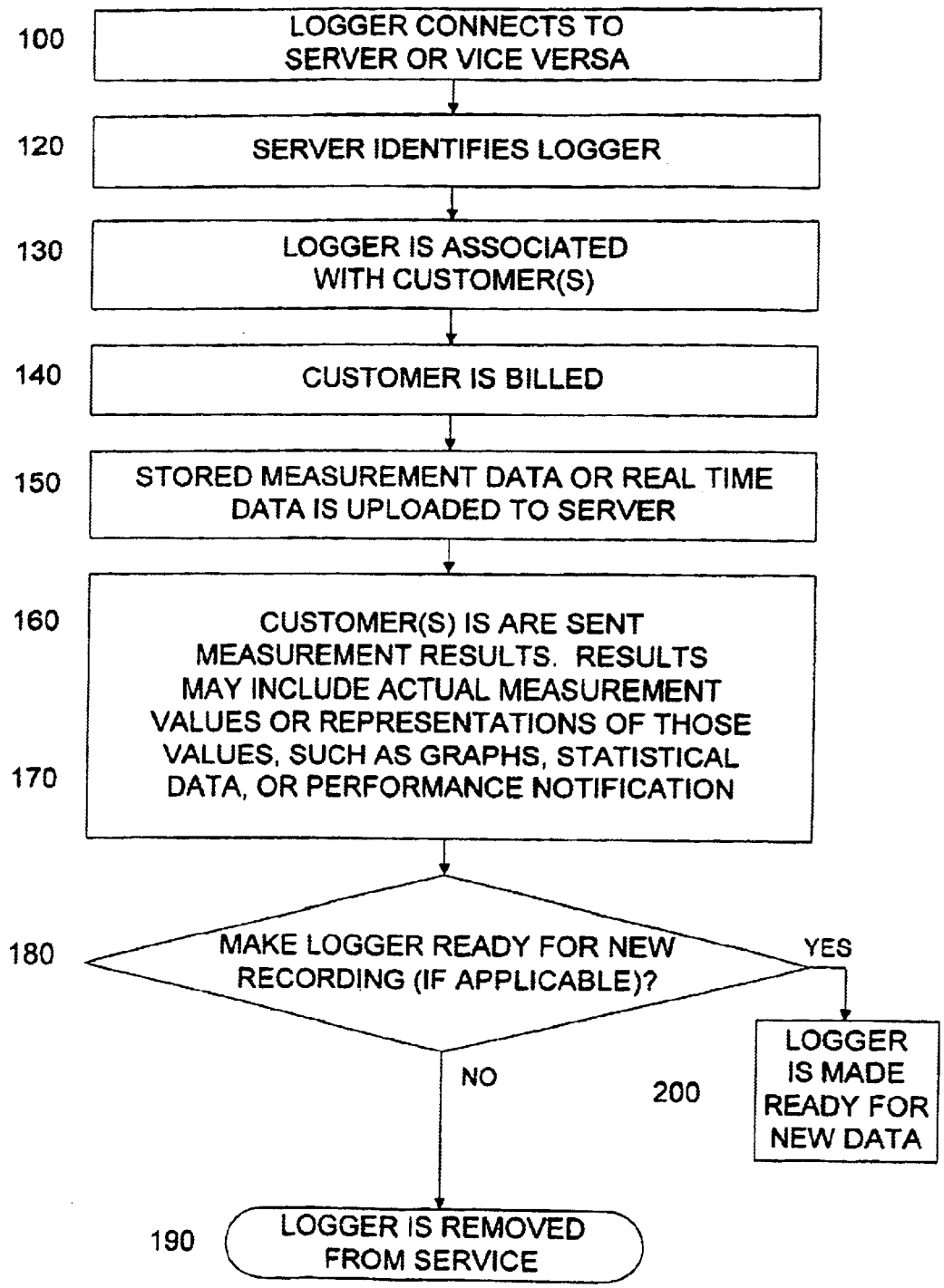
FIG. 2 is a flow chart illustrating a method of remotely reading, enabling and reprogramming data loggers and charging a fee according to an alternative embodiment of the present invention.

Referring to FIG. 2, at step 110, the logger establishes a link between itself and the system. The logger is then identified by the system utilizing an electronic footprint, Electronic Serial Number or other identifier, embedded in the data logger, step 120. The logger is then associated with the appropriate customer, step 130. The server then generates customer billing information for the specific transaction, step 140. It should be noted that although the presently preferred embodiment performs customer billing at the time of each upload, that billing can occur after the upload or can be performed at predetermined time periods. The measurement data is uploaded to the server, where it is stored or otherwise manipulated as desired by the customer, step 150. The system then sends the measurement data or other representations of that data, as desired by the customer, to the customer or others designated for receiving such information, step 160. It is then determined whether the logger is to take additional measurements, step 170. If it is determined that additional measurements are desired, the logger may be reset to make a new set of measurements, which may be of the same or different type depending on the capabilities of the sensors that are coupled with or part of the logger, step 180. Alternatively, if its is determined that no more measurements are required then the logger can be temporarily or permanently removed from service, step 190.

Figure 2A:
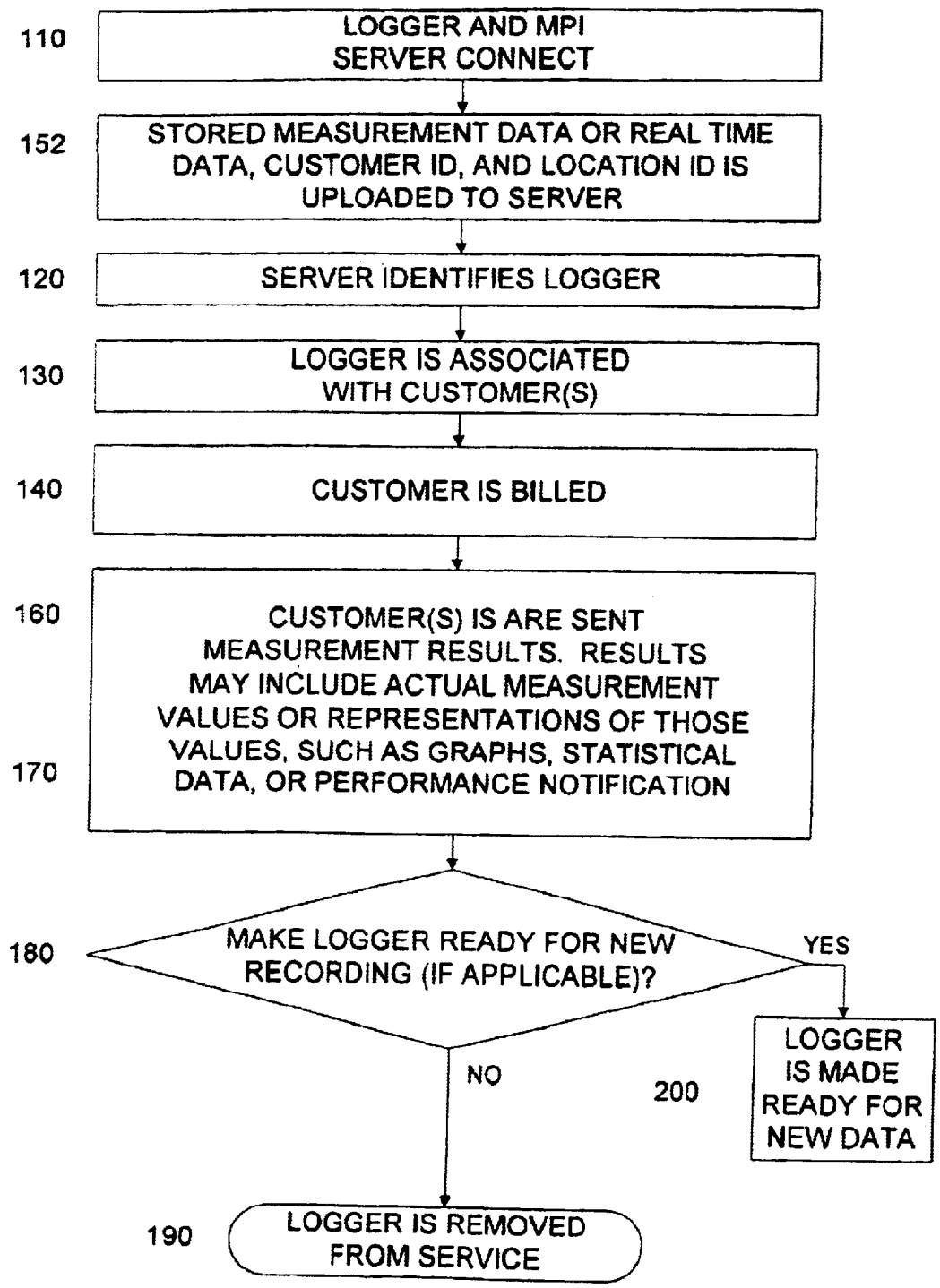
FIG. 2A is a flow chart illustrating an alternative to the embodiment illustrated in FIG. 2.

The method illustrated in the flow chart of FIG. 2A provides an alternative to that illustrated in FIG. 2. Step 150 has been moved in sequence and modified to include customer identifying and location identifying information at step 152.

An application of the embodiments of the present invention is in the field of stationary monitoring. The current technology for stationary sensor-based applications includes analog and digital devices that accumulate and transfer data, whereupon the data is interpreted by software residing on a personal computer. In addition, with respect to current technology there are data acquisition hardware components that can be added to enable a computer to become a fully functional scientific instrument, compatible with the method and system of one embodiment of the present invention. The present invention eliminates the need for a local user software interface, and relies instead on software operating on a network-based server to interpret the data, present it in a readable form, archive the data, and bill for the use of the software services. For data acquisition purposes, the user can be allowed to configure a sensor-based device on-line and, therefore, to enable it to perform specific scientific applications, such as monitoring voltage or oxygen levels. For calibration purposes, the present invention allows the user to calibrate the device for ISO, NIST and other quality assurance standards, thereby ensuring that the data logger is operating within required specifications. As described above, the need to return the device to the manufacturer, policing agency or scientific testing laboratory is alleviated, as reading the device for an indication of proper quality assurance practices can be accomplished on-line, via network software, and billed to the customer account. Further, in the case of a supermarket chain or other establishment having a plurality of locations, the sensor data from a number of locations can be monitored at few locations thereby decreasing monitoring costs and resources devoted to monitoring.

A still further application of the present invention is in the field of stationary sensor base applications for continuous monitoring of environmental conditions, such as those used in refrigeration of temperature sensitive goods. The available art in this field includes analog and digital services that accumulate data at a local level. In known systems, when alarm conditions occur, an on-site device may alert personnel via audible sound, light, or via telephone communication than an environmental condition has reached unacceptable conditions.

The present invention reduces the need for local user software interfaces, and relies on software operating on the network-based server to interpret and present the data in a readable form, archive the data, and bill for use of the software services. For sensor-based applications such as the monitoring of humidity, temperature, vibration or motion, pressure, sound, or other like items, the sensor can be continuously or periodically monitored via the server. When alarm conditions occur, an e-mail, telefax, page, automated telephone call or posting to a dynamic web page is triggered to notify interested and authorized parties who are off-site in an efficient method. Thus, proper use of the system and method of the present invention can prevent breach of environmental conditions due to the absence or negligence of personnel.

The present invention also can be utilized in the field of environmental control. The current technology for stationary sensor-based applications for controlling environmental conditions includes analog and digital devices that accumulate data at a local level and adjust temperature, light, humidity, or other such environmental factors according to a pre-set program. When conditions occur outside the pre-set program, an on-site device may make adjustments to the system to bring it back to acceptable programmed parameters.

The present invention bypasses the need for a local user software or firmware interface, and relying on the proprietary system residing on the network-based server to control the environmental conditions, such as in a chamber used for the ripening of fruits and vegetables. In addition to providing environmental control, a preferred embodiment of the system and method of the present invention also documents the environmental sensor history, interprets the data, presents it in a readable form, archives the data, and bills for the use of the software services, all in a remote fashion across a wide area network or other remote link such as the Internet.

Problems associated with corrupted software located on individual computers can be avoided by use of the present invention, because all data loggers are preferably read from a central server controlled by the device manufacturer or other entity controlling the distribution of information and access to the loggers (referred to herein throughout as the "controlling entity"). This can be important in instances where the computer that stores or manipulates the data would otherwise be stored at or near a freezer, refrigerator, oven, heater or other environment which could degrade operation of or damage the computer. Substantial control over the costs of updating device software is also provided by the invention.

Further, problems associated with collecting moneys from customers who do not pay for services or goods received can now be controlled. An additional feature of the present invention enables logger manufacturers, or monitoring service providers, to shut off connections to the central server so that some or all of the delinquent customer's devices in the field may be (temporarily or permanently) rendered useless because of non-payment. This provides a point of leverage for the controlling entity to induce customers to pay their bills or suffer the consequences of reduced or eliminated access to tracking services.

Presently, manufacturers of temperature recording devices used in transportation do not know who the end user is or where the device is located in all situations. The method and system of the present invention also addresses this issue by preferably reading the device through the remote network and controlled server, user identifying the end user through any desired limited access scheme available in the related art.

An exemplary reprogrammable logger preferably used as part of the method and system of the present invention is the C/TEMP™, available from Marathon Products of Oakland, Calif., assignee of the present invention. One challenge faced in marketing such sophisticated devices is the price competition with technologically unsophisticated strip charts, which presently cost nearly two-thirds less than even a basic reprogrammable device. It is therefore desirable to implement a strategy whereby manufacturers can offer sophisticated, field programmable devices for one-time use at a price point competitive with disposable strip charts.

To provide this advantage, with the method and system of the present invention, a manufacturer's reprogrammable data loggers such as the C/TEMP™ can be read only through a remote server, preferably controlled by the device manufacturer, via a connection to the Internet or a similar wide area network, the user preferably having pre-established account information for billing, location and shipping information.

Referring now to FIG. 3, which depicts operation of the system in a shipping environment, the logger is shipped, along with the cargo, from the shipper 200 to the receiver 210 to perform the desired monitoring or measuring operations on the shipped material. After receipt of the shipment the receiver 210 activates a remote reading of the logger and returns the logger to the shipper 200 for use with other shipments to the same receiver 210 or to other receivers. Also, during shipment, stored data can be transmitted from the server 220 to interested parties 230, such as shipper 200, receiver 210, or any other desired party such as an insurer or shipping company personnel that can effect changes in shipping conditions.

Referring to FIG. 4, which depicts an alternate operation of the system in a shipping environment, the logger is sent to a shipper 300 by the service provider. The shipper 300 then can communicate with the service provider's server 310 to identify what parameters to measure, the times/and or time intervals the measurements are to be taken, the types of operations, if any, it wants performed on the data received from the measurements, and when and to whom it wants the data transmitted. The data, whether in the original or other format, is then transmitted to the interested parties 330 as dictated by the shipper. After completion of the shipment, the logger is shipped from the receiver 320 to the service provider for use by other shippers and receivers.

Referring to FIG. 5, there is depicted an operation of the system in a stationary monitoring environment. The logger is maintained at a stationary location 400. The server 410 communicates with the logger at the stationary location 400. The information uploaded by the server is transmitted to the interested parties 420 regularly, instantly or in alarm conditions, as previously specified by the customer(s).

In still another embodiment of the invention, a multi-use device reprogrammer may be stationed at the user's location, thereby reducing the required instances where the device must be returned for reprogramming or data access even if remote access through a computer network link is not used. For example, such a reprogrammer may be leased and contain an access card good for a predetermined number of device reprogrammings. If the card is set for fifty reprogrammings, it may be purchased for fifty-times the standard device access fee (or at some discounted rate), thereby controlling device access and re-use in a manner independent of a remote network connection while still providing decreased total cost for implementing the logging method of the present invention. New or reprogrammed multi-use cards can be installed or used in the reprogrammer once the relevant customer accounts are settled.

An additional feature which may be utilized in an alternative embodiment includes a built-in buzzer or other noise emitting device. If the logger is lost in a large container, a loud buzzer will be emitted with an RF link attached inside so that the device can be located. A party unable to locate the device will simply contact the device manufacturer, and a signal will be transmitted from the server to a radio or similar network to the device activating the buzzer. In the alternative, a known Global Positional Satellite ("GPS") element may be added to the logger, enabling real time tracking of device position and an indication of when shipped material has arrived at its intended destination, or when stored materials have been moved.

The described and depicted embodiments of the present invention offer a number of advantages over know systems, including:

1) Establishes an electronic footprint for each reprogrammable device being read, thereby tracking customer, time, and information recorded on the logger device to be saved, manipulated and archived by the controlling entity. Customer location information may be obtained as well. Armed with this information, a shipper can prevent fraud by a customer who might otherwise assert that he did not receive the shipment since the data logger after reading creates an electronic footprint at the customer's access point and/or on the device itself of who initiated the remote reading.

2) Allows flexible pricing structures for each reprogrammable device being read, including such billing methods as: (1) per reading cost; (2) per data transmission costs, e.g. by number and/or number of receivers, (3) length of time of the shipment, (4) number of shipments, or (5) any combination of the above.

3) Allows reading data from the reprogrammable device remotely from the manufacturer's server, automatically storing the data, and e-mailing or otherwise automatically forwarding it to multiple locations. For instance, the shipper and end user (customer purchasing the shipped item) will now have immediate access to this information via the logger manufacturer's, or monitoring service provider's server, which each customer will access by providing proprietary account numbers and linked passwords, preferably through a standard web browser interface. If unfavorable information (e.g., out of acceptable temperature ranges) is read from the device, the server may automatically e-mail or have the customer paged either electronically or through a telecommunications system (such as via fax, voicemail or a wireless pager network).

4) Allows flexible return of each reprogrammable device to the party who originally shipped the device, or to the manufacturer or service provider, if reprogramming in excess of the remote reprogramming capabilities is desired.

5) Minimizes the administrative costs, by allowing a party to reprogram the device themselves, or have the device reprogrammed and used by other users. In one alternative embodiment, reprogrammable devices such as those available from Xilinx, Inc., Lucent, Inc. or Altera, Inc. may be utilized and remotely reprogrammed over a wide area network such as the Internet to alter the functionality of the logger according to its needed use.

6) Provides customers with the most up to date software over the Internet, thereby avoiding incompatibility, software corruption and software obsolescence. Also, provides for remote updating of device functionality as explained above.

7) Provides a customer incentive to visit the manufacturer's or controlling entity's web site, thereby allowing expansion of its e-commerce capabilities to include: advertising, sales of related products, auctioning of goods and services, and providing industry-specific information to any industry in which the loggers are used.

8) Substantially lowers the costs associated with reprogramming, testing, recalibration, replacing thermographic paper, replacing batteries, and transportation costs associated with shipping and handling, that drive up the costs that tracking device manufacturers must charge their customers for use of such devices, by allowing the users to reprogram the data loggers electronically utilizing a web-enabled software and central server.

9) Allows the parties to a shipment to know where the device is located, its time of reading and when time/temperature sensitive items have arrived, along with all other relevant stored data. This is determined by the use of an electronic footprint placed by the controlling entity or its server after each exchange of information over the communication link.

10) Reduces the inventory needed by a manufacturer or service provider to service their customers worldwide because the cost of carrying inventory will now be borne by the supplier with single-use programmed devices.

The present invention therefore provides a novel method and system for procuring, storing and distributing remotely accessed data gather by logging devices. Although the present invention has been shown and described with respect to a preferred and various alternative embodiments, various changes and modifications lie within the spirit and scope of the claimed invention. Thus, the corresponding structures, materials, acts, and equivalents of all means or step plus function elements in the claims are intended to include any structure, material, or acts for performing the functions in combination with other elements as specifically claimed.

What is claimed is:

1. A method for billing a customer over a network for use of an environmental data logger, which monitors and stores environmental condition data of contents of a shipping container, the method comprising:

connecting the data logger to a network upon receipt of the shipping container at a destination;

providing a connection to a billing server to a customer via the network;

upon access of the server, allowing the customer to access data stored on the data logger; and billing the customer for accessing the data on the data logger via the billing server;

wherein the customer is billed for the use of the data logger only upon receipt of the data logger at the destination and subsequent access of the data.

2. The method of claim 1, wherein the data stored on the data logger is transferred from the data logger and stored on the server, such that environmental data relating to the contents of the shipping container can be stored and statistical data can be processed for all of the customer's data loggers.

3. The method of claim 2, further comprising:

allowing third-parties to access the data from data logger that is stored on the server; and billing the customer for each access by a third-party, thereby providing access to the environmental data stored on the data logger and also to any statistical data that has been processed and stored on the server via the network.

4. The method of claim 3, wherein the data includes information regarding one or more members of a group consisting of temperature, humidity, motion, pressure, voltage, flow and sound.

5. A method for billing a customer over a network for reprogramming a one-time use environmental data logger, which monitors and stores environmental condition data of contents of a shipping container, the method comprising:

connecting the data logger to a network upon receipt of the shipping container at a destination;

providing a customer access to a server via a network;

reprogramming the one-time use data logger via the network; and billing the customer for reprogramming the data logger via the network, thereby facilitating remote reprogramming of the data logger without requiring the customer to return the data logger for reprogramming.

6. The method of claim 5, further comprising recalibration the data logger when the data logger is reprogrammed.

7. The method of claim 6, wherein the data includes information regarding one or more members of a group consisting of temperature, humidity, motion, pressure, voltage, flow and sound.

8. A method of billing a customer for use of a one-time use environmental data logger, which monitors and stores environmental condition data of contents of a shipping container, the method comprising:

connecting the data logger to a network upon receipt of the shipping container at a destination;

providing a connection over a network to a server to a customer;

upon access of the server, allowing the customer to access data stored on the data logger;

reprogramming the one-time use data logger via the network; and billing the customer for accessing the data on the data logger and for reprogramming the data logger via the network, thereby facilitating remote reprogramming of the data logger without requiring the customer to return the data logger for reprogramming.

9. The method of claim 8, further comprising recalibrating the data logger when the data logger is reprogrammed.

10. The method of claim 9, wherein the data stored on the data logger is transferred from the data logger and stored on the server, such that environmental data relating to the contents of the shipping container can be stored and statistical data can be processed for all of the customer's data loggers.

11. The method of claim 10, further comprising:

allowing third-parties to access the data from data logger that is stored on the server; and billing the customer for each access by a third-party, thereby providing access to the environmental data stored on the data logger and also to any statistical data that has been processed and stored on the server via the network.

12. The method of claim 11, wherein the data includes information regarding one or more members of a group consisting of temperature, humidity, motion, pressure, voltage, flow and sound.

* * * * *